(12) United States Patent
Li et al.

(10) Patent No.: US 12,198,440 B2
(45) Date of Patent: Jan. 14, 2025

(54) VEHICLE PERCEPTION BY ADJUSTING DEEP NEURAL NETWORK CONFIDENCE VALVES BASED ON K-MEANS CLUSTERING

(71) Applicants: Dalong Li, Troy, MI (US); Rohit S Paranjpe, Rochester Hills, MI (US); Stephen Horton, Rochester, MI (US)

(72) Inventors: Dalong Li, Troy, MI (US); Rohit S Paranjpe, Rochester Hills, MI (US); Stephen Horton, Rochester, MI (US)

(73) Assignee: FCA US LLC, Auburn Hills, MI (US)

( * ) Notice: Subject to any disclaimer, the term of this patent is extended or adjusted under 35 U.S.C. 154(b) by 365 days.

(21) Appl. No.: 17/872,112

(22) Filed: Jul. 25, 2022

(65) Prior Publication Data

US 2024/0029442 A1 Jan. 25, 2024

(51) Int. Cl.
| | |
|---|---|
| *G06V 20/56* | (2022.01) |
| *G06V 10/762* | (2022.01) |
| *G06V 10/764* | (2022.01) |
| *G06V 10/774* | (2022.01) |
| *G06V 10/776* | (2022.01) |
| *G06V 10/778* | (2022.01) |
| *G06V 10/80* | (2022.01) |

(52) U.S. Cl.
CPC ............ *G06V 20/56* (2022.01); *G06V 10/763* (2022.01); *G06V 10/764* (2022.01); *G06V 10/774* (2022.01); *G06V 10/776* (2022.01); *G06V 10/7796* (2022.01); *G06V 10/806* (2022.01)

(58) Field of Classification Search
CPC .......... H04N 1/00082; H04N 1/00037; H04N 1/00633; H04N 1/6097; B41M 7/0027; G03G 15/6582; G06T 7/001; G06T 2207/10024; G06T 2207/30144; G06T 2207/30168
USPC .......................................................... 382/103
See application file for complete search history.

(56) References Cited

U.S. PATENT DOCUMENTS

| | | | |
|---|---|---|---|
| 11,532,168 B2* | 12/2022 | Smolyanskiy | .......... G01S 17/89 |
| 2017/0075355 A1* | 3/2017 | Micks | .................. G05D 1/0274 |
| 2019/0108447 A1 | 4/2019 | Kounavis et al. | |
| 2019/0258878 A1 | 8/2019 | Koivisto et al. | |
| 2020/0026960 A1 | 1/2020 | Park et al. | |
| 2021/0352203 A1* | 11/2021 | Zhou | .................... H04N 23/745 |
| 2023/0065931 A1* | 3/2023 | Patzwaldt | .............. G06V 20/56 |

(Continued)

*Primary Examiner* — Negussie Worku
(74) *Attorney, Agent, or Firm* — Jeremy J. Klobucar

(57) ABSTRACT

Vehicle perception techniques include obtaining a training dataset represented by N training histograms, in an image feature space, corresponding to N training images, K-means clustering the N training histograms to determine K clusters with respective K respective cluster centers, wherein K and N are integers greater than or equal to one and K is less than or equal to N, comparing the N training histograms to their respective K cluster centers to determine maximum in-class distances for each of K clusters, applying a deep neural network (DNN) to input images of the set of inputs to output detected/classified objects with respective confidence scores, obtaining adjusted confidence scores by adjusting the confidence scores output by the DNN based on distance ratios of (i) minimal distances of input histograms representing the input images to the K cluster centers and (ii) the respective maximum in-class.

16 Claims, 4 Drawing Sheets

(56) References Cited

U.S. PATENT DOCUMENTS

| | | | |
|---|---|---|---|
| 2023/0068046 A1* | 3/2023 | Bush | B60W 60/001 |
| 2023/0152801 A1* | 5/2023 | Park | G06V 10/776 |
| | | | 706/20 |
| 2024/0071092 A1* | 2/2024 | Schulter | G06V 10/764 |

* cited by examiner

VEHICLE PERCEPTION BY ADJUSTING DEEP NEURAL NETWORK CONFIDENCE VALVES BASED ON K-MEANS CLUSTERING

FIELD

The present application generally relates to vehicle advanced driver-assistance systems (ADAS) and autonomous driving and, more particularly, to techniques for improved vehicle perception by adjusting deep neural network (DNN) confidence values based on k-means clustering.

BACKGROUND

In ADAS and autonomous vehicle driving, perception is typically performed by trained DNNs with sensor inputs. Utilizing sensor data (camera(s), LIDAR, RADAR, maps/GPS, etc.) as input, these DNNs can predict object location, class/type, as well as confidence values. Confidence values are typically then used in "sensor fusion" to combine information from multiple sources in an effort to produce more accurate results. DNNs are trained using training datasets, which are typically limited in size and thus may not cover all possible scenarios. More specifically, trained DNNs in deployment could see something that never appeared in its training dataset(s), and thus the DNNs could report a potentially untrustworthy high confidence value. This potentially untrustworthy high confidence value could result in inaccurate object detection and/or sensor fusion outputs. Accordingly, while such conventional vehicle perception systems do work well for their intended purpose, there exists an opportunity for improvement in the relevant art.

SUMMARY

According to one example aspect of the invention, a perception system for a vehicle is presented. In one exemplary implementation, the perception system comprises a set of vehicle perception sensors configured to provide a set of inputs, wherein the set of vehicle perception sensors comprises at least a camera system configured to capture images of an environment external to the vehicle, and a controller configured to obtain a training dataset represented by N training histograms, in an image feature space, corresponding to N training images, respectively, K-means cluster the N training histograms to determine K clusters with respective K respective cluster centers, wherein K and N are integers greater than or equal to one and K is less than or equal to N, compare the N training histograms to their respective K cluster centers to determine maximum in-class distances for each of K clusters, apply a deep neural network (DNN) to input images of the set of inputs to output detected/classified objects with respective confidence scores, obtain adjusted confidence scores by adjusting the confidence scores output by the DNN based on distance ratios of (i) minimal distances of input histograms representing the input images to the K cluster centers and (ii) the respective maximum in-class distance, and use the adjusted confidence scores for sensor fusion as part of an advanced driver-assistance system (ADAS) or autonomous driving feature.

In some implementations, the K-means clustering is a vector quantization technique in which the N training histograms are N vectors that are partitioned into K clusters such that each of the N vectors belongs to a respective cluster of the K clusters having the nearest mean. In some implementations, the K-means clustering minimizes within-cluster variances but not Euclidean distances. In some implementations, adjusting the confidence scores further comprises determining discount probability (DP) values based on the distance ratios, and adjusting the confidence scores based on the DP values.

In some implementations, adjusting the confidence scores further comprises obtaining a threshold for determining if a sample is in-class or out-of-class, and applying a scaled sigmoid function based on the distance ratios and the threshold to compute the DP values. In some implementations, the scaled sigmoid function ($S(x)$) to calculate the DP values is:

$$S(x) = \frac{2}{1+e^{-x}} = \frac{2 \times e^x}{e^x + 1}, \text{ where}$$

$$x = K\left(1 - \max\left(\frac{d}{T \times d_{max-in-class}}, 1\right)\right),$$

and where x is the input histograms representing the input images, T is the threshold, K is a scaling factor, and $d_{max-in-class}$ is the maximum in-class distance.

In some implementations, the sensor fusion includes fusing the detected objects/classifications and confidence scores for images captured by the camera system with detected objects/classifications and confidence scores for information gathered by a remainder of the set of vehicle perception sensors to improve object detection/classification accuracy and/or robustness. In some implementations, the remainder of the set of vehicle perception sensors includes at least one of another camera system, a LIDAR system, a RADAR system, and a map system.

According to another example aspect of the invention, a perception method for a vehicle is presented. In one exemplary implementation, the perception method comprises receiving, by a controller of the vehicle and from a set of vehicle perception sensors of the vehicle, a set of inputs, wherein the set of vehicle perception sensors comprises at least a camera system configured to capture images of an environment external to the vehicle, obtaining, by the controller, a training dataset represented by N training histograms, in an image feature space, corresponding to N training images, K-means clustering, by the controller, the N training histograms to determine K clusters with respective K respective cluster centers, wherein K and N are integers greater than or equal to one and K is less than or equal to N, comparing, by the controller, the N training histograms to their respective K cluster centers to determine maximum in-class distances for each of K clusters, applying, by the controller, a DNN to input images of the set of inputs to output detected/classified objects with respective confidence scores, obtaining, by the controller, adjusted confidence scores by adjusting the confidence scores output by the DNN based on distance ratios of (i) minimal distances of input histograms representing the input images to the K cluster centers and (ii) the respective maximum in-class distance, and using, by the controller, the adjusted confidence scores for sensor fusion as part of an ADAS or autonomous driving feature.

In some implementations, the K-means clustering is a vector quantization technique in which the N training histograms are N vectors that are partitioned into K clusters such that each of the N vectors belongs to a respective cluster of the K clusters having the nearest mean. In some implementations, the K-means clustering minimizes within-cluster variances but not Euclidean distances. In some implementations, adjusting the confidence scores further comprises determining DP values based on the distance ratios, and adjusting the confidence scores based on the DP values.

In some implementations, adjusting the confidence scores further comprises obtaining a threshold for determining if a sample is in-class or out-of-class, and applying a scaled sigmoid function based on the distance ratios and the threshold to compute the DP values. In some implementations, the scaled sigmoid function (S(x)) to calculate the DP values is:

$$S(x) = \frac{2}{1+e^{-x}} = \frac{2 \times e^x}{e^x + 1}, \text{ where}$$

$$x = K\left(1 - \max\left(\frac{d}{T \times d_{max-in-class}}, 1\right)\right),$$

and where x is the input histograms representing the input images, T is the threshold, K is a scaling factor, and $d_{max-in-class}$ is the maximum in-class distance.

In some implementations, the sensor fusion includes fusing the detected objects/classifications and confidence scores for images captured by the camera system with detected objects/classifications and confidence scores for information gathered by a remainder of the set of vehicle perception sensors to improve object detection/classification accuracy and/or robustness. In some implementations, the remainder of the set of vehicle perception sensors includes at least one of another camera system, a LIDAR system, a RADAR system, and a map system.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As previously discussed, there exists an opportunity for improvement in the art of vehicle perception and, more particularly, vehicle object detection for advanced driver-assistance systems (ADAS) and autonomous driving. In particular, conventional deep neural networks (DNNs) for object detection and sensor fusion could produce untrustworthy high confidence values due to training dataset limitations, which could negatively impact object detection performance. Accordingly, improved vehicle perception or object detection systems and methods are presented herein. First, each training dataset is K-means clustered in the feature space of images. This includes computing histograms of images and using these histograms to cluster images. After K-means clustering, K cluster centers are obtained. All of the images are compared to the K cluster centers and the maximum in-class distances therefrom are recorded. When testing a new image, its histogram is computed and compared to the K cluster centers, and its minimal distance is compared to the maximum in-class distance to determine a ratio that is then adjusted through a scaled sigmoid function to obtain a final adjusted confidence value that is used in operation. Potential benefits include increased DNN object detection accuracy.

Figure 1:
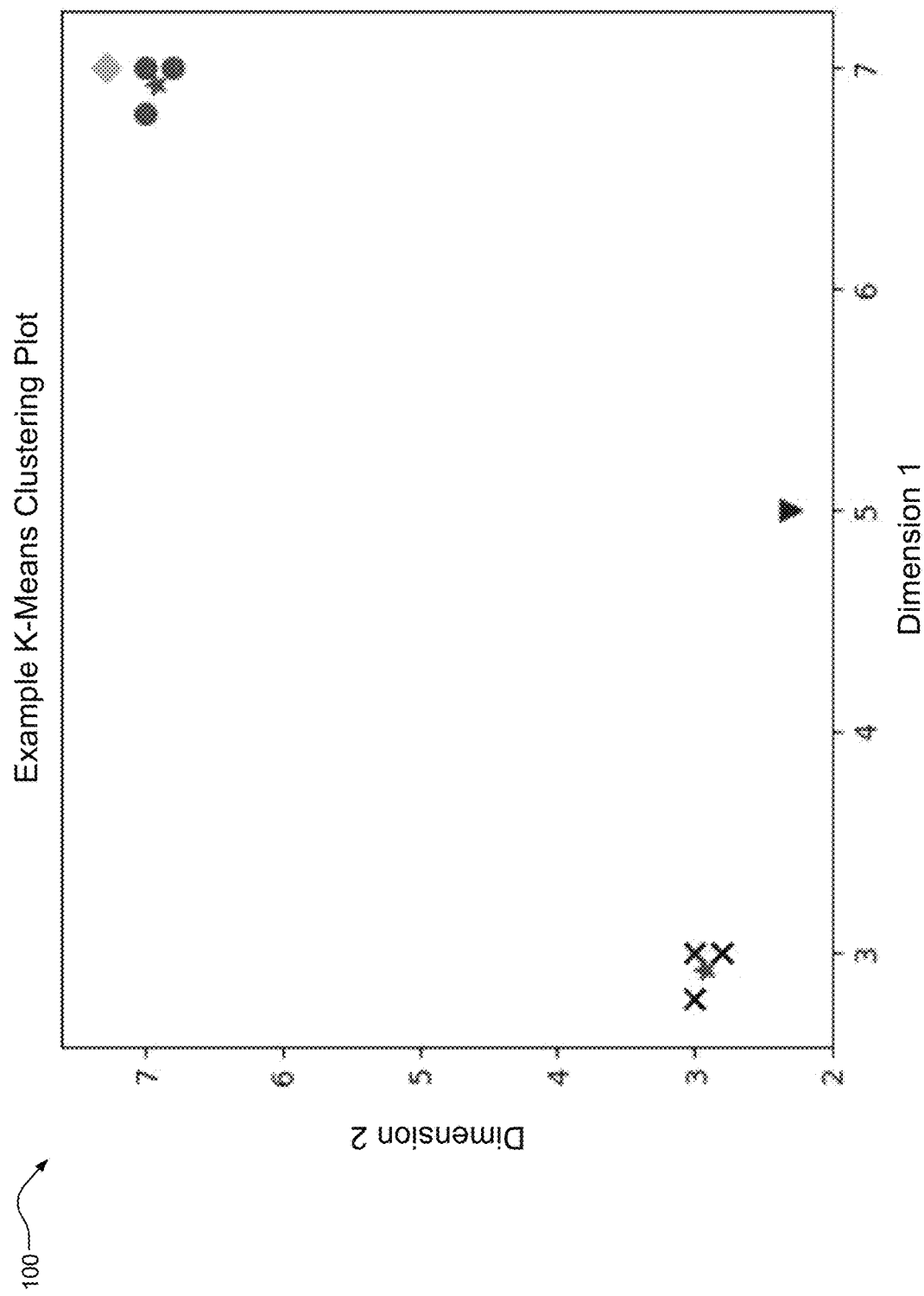
FIG. 1 is a plot illustrating example K-means clusters, K cluster centers, and in-class and out-of-class samples according to the principles of the present application.

Referring now to FIG. 1, a plot 100 illustrating example K-means clusters, K cluster centers, and in-class and out-of-class samples according to the principles of the present application is illustrated. The x and y axes correspond to dimensions 1 and 2 in the image feature space (e.g., x/y coordinates in two-dimensional, or 2D images). To achieve a desired sample distribution for desired clustering, these axes could be normalized (i.e., varying scales/percentages relative to each other). As shown, three samples (X-shapes) in the lower left quadrant are identified as a first cluster (indicated by a star-shape) and three samples (circle-shapes) in the upper right quadrant are identified as a second cluster (also indicated by the star-shape).

In-class and out-of-class samples are also illustrated by the diamond-shape and triangle-shape samples. Thus, for this example there is a total of eight samples (N=8) and K=2 (K and N being integers greater or equal to one and N≥K). The K-means clustering is a vector quantization technique in which the N training histograms are N vectors that are partitioned into K clusters such that each of the N vectors belongs to a respective cluster of the K clusters having the nearest mean. The K-means clustering minimizes within-cluster variances but not Euclidean distances. It will be appreciated that this plot 100 is merely an example for illustrative/descriptive purposes and is in no way intended to limit the K-means clustering techniques herein.

Figure 2:
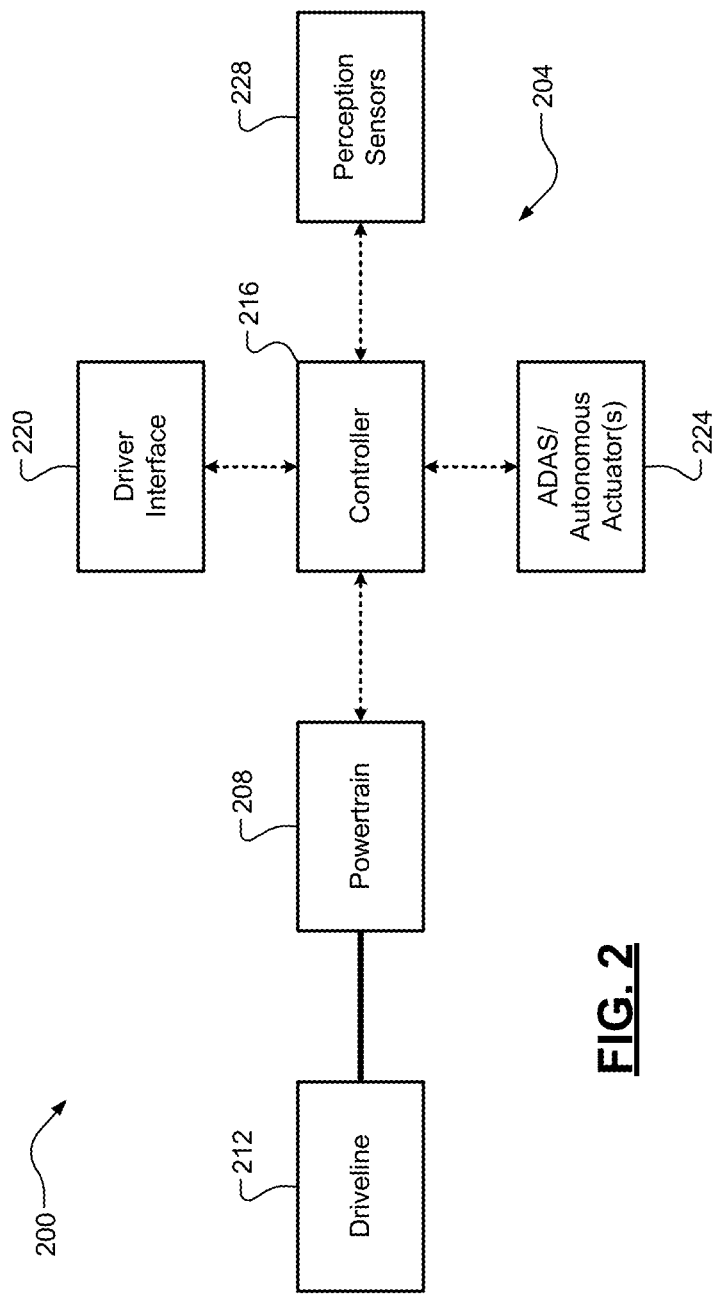
FIG. 2 is a functional block diagram of a vehicle having an example perception system configured for object detection according to the principles of the present application.

Referring now to FIG. 2, a functional block diagram of a vehicle 200 having an example perception system 204 for object detection/classification according to the principles of the present application is illustrated. The vehicle 200 could be any suitable type of vehicle (a conventional engine-powered vehicle, a hybrid electric vehicle, a fully-electrified vehicle, etc.). The vehicle 200 generally comprises a powertrain 208 (e.g., an engine, electric motor(s), or some combination thereof, plus a transmission) configured to generate and transfer drive torque to a driveline 212 for vehicle propulsion.

A controller 216 controls operation of the vehicle 200, including controlling the powertrain 208 to generate a desired amount of drive torque based on a driver torque request received via a driver interface 220 (e.g., an accelerator pedal). The controller 216 is also configured to execute/perform one or more ADAS/autonomous driving features (e.g., up to level 4, or L4 autonomous driving), which generally includes controlling a set of one or more ADAS/autonomous actuator(s) based on information gathered from a plurality of perception sensors 228. Thus, the perception system 208 generally comprises the controller 216, the ADAS/autonomous actuator(s) 224, and the perception sensors 228.

Non-limiting examples of the ADAS/autonomous actuator(s) 224 include an accelerator actuator, a brake actuator, and a steering actuator. In other words, these actuator(s) 224 include actuators for aspects of vehicle control that would typically be handled by a human driver. Non-limiting examples of the perception sensors 228 include one or more cameras configured to capture images of an environment external to the vehicle 200 (e.g., a front-facing camera), a light detection and ranging (LIDAR) system, a radio detection and ranging (RADAR) system, and a map system (a high definition (HD) map system, a global navigation satellite system (GNNS) transceiver, etc.). The concept of "sensor fusion" will be discussed in greater detail below. This involves the fusing of outputs (e.g., detected/classified objects) based on respective confidence values to provide the most accurate/robust outputs or results as possible. In other words, a single system (e.g., a camera-based object detection DNN) may provide adequate results, but these results could be improved even further when combined with similar results from other systems (e.g., LIDAR and an HD map system). The techniques of the present application will now be discussed in greater detail.

Figure 3:
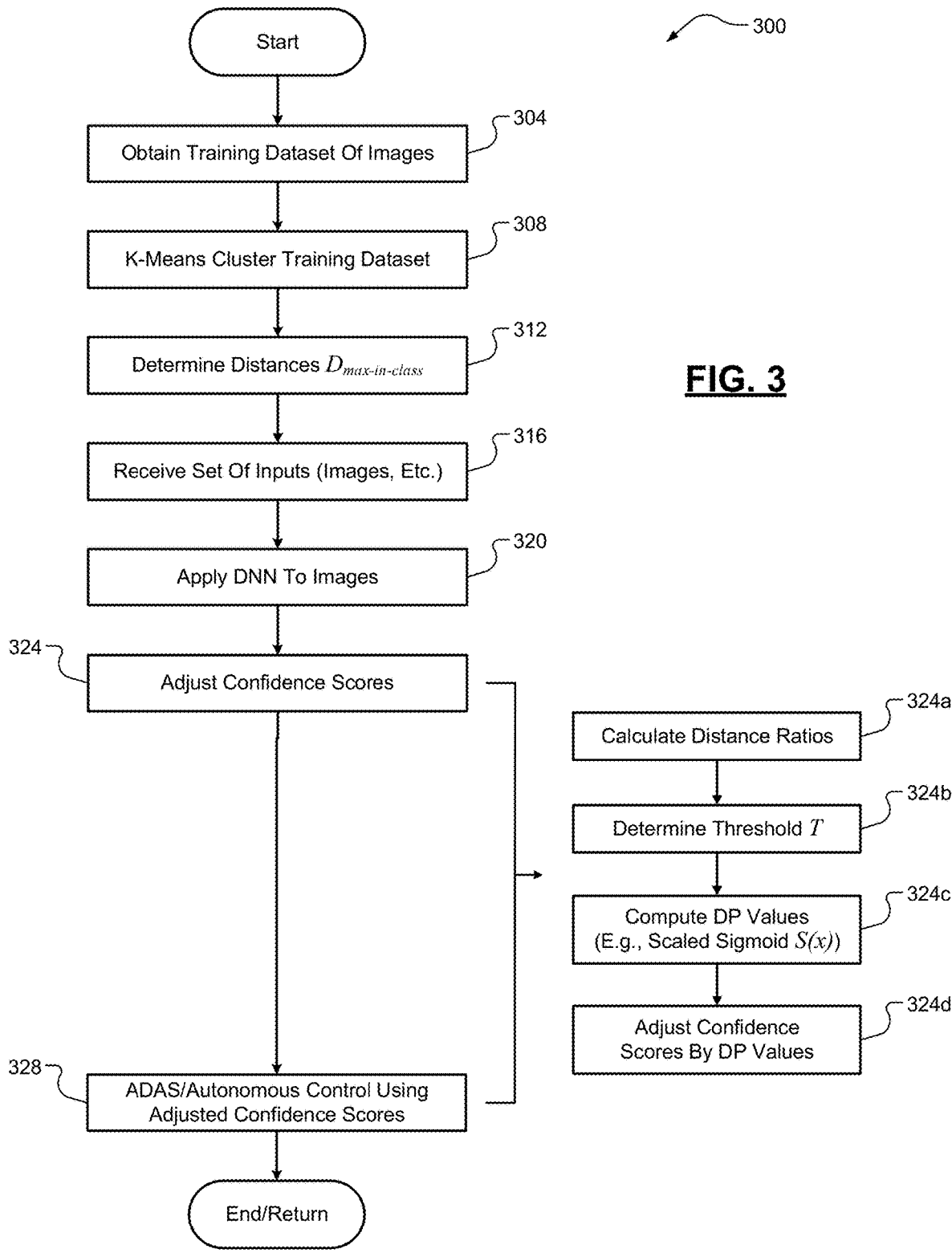
FIG. 3 is a flow diagram of an example vehicle perception method including object detection/classification according to the principles of the present application.

Referring now to FIG. 3, a flow diagram of an example perception (e.g., object detection/classification) method 300 for a vehicle according to the principles of the present application is illustrated. For illustrative/explanatory purposes, vehicle 200 and its components will be referenced in describing the method 300, but it will be appreciated that the method 300 could be applicable to any suitable vehicle. At 304, the controller 216 obtains a training dataset represented by N training histograms, in the image feature space, corresponding to N training images, respectively. At 308, the controller 216 K-means clusters the N training histograms to determine K clusters with respective K respective cluster centers, wherein K and N are integers greater than or equal to one and K is less than or equal to N. At 312, the controller 216 compares the N training histograms to their respective K cluster centers to determine maximum in-class distances (D max-in-class) for each of K clusters. For reference, FIG. 1 and the previous discussion herein further illustrates this K-means clustering and distance determination process. These steps 304-312 can be described as the training process for the DNN's confidence scores, whereas the following steps 316-328 can be described as the usage or implementation of the trained DNN (e.g., in sensor fusion). At 316, the controller 216 receives, from the perception sensors 228, a set of inputs including at least input images captured by a camera system. At 320, the controller 216 applies a DNN to input images of the set of inputs to output detected/classified objects (histograms for the input images) with respective confidence scores.

At 324, the controller 216 obtains adjusted confidence scores by adjusting the confidence scores output by the DNN. In one example implementation, this confidence score adjustment process involves the computation and application of discount probability (DP) values, e.g., a potential negative adjustment to a respective confidence score, which is also partially shown in a plot 400 of FIG. 4 and discussed in greater detail below. First, distance ratios of (i) minimal distances of input histograms representing the input images to the K cluster centers and (ii) the respective maximum in-class distance $D_{max-in-class}$ are calculated/computed (324a).

Next, a threshold (T) for determining if a particular sample is in-class or out-of-class is determined (324b). Next, this threshold and the distance ratios are used to compute the DP values (324c). In one exemplary implementation, this includes applying a scaled sigmoid function (S(x)) as follows, where x is the input histograms representing the input images and K is a scaling factor:

$$S(x) = \frac{2}{1+e^{-x}} = \frac{2 \times e^x}{e^x + 1}, \text{ where}$$

$$x = K\left(1 - \max\left(\frac{d}{T \times d_{max-in-class}}, 1\right)\right).$$

Figure 4:
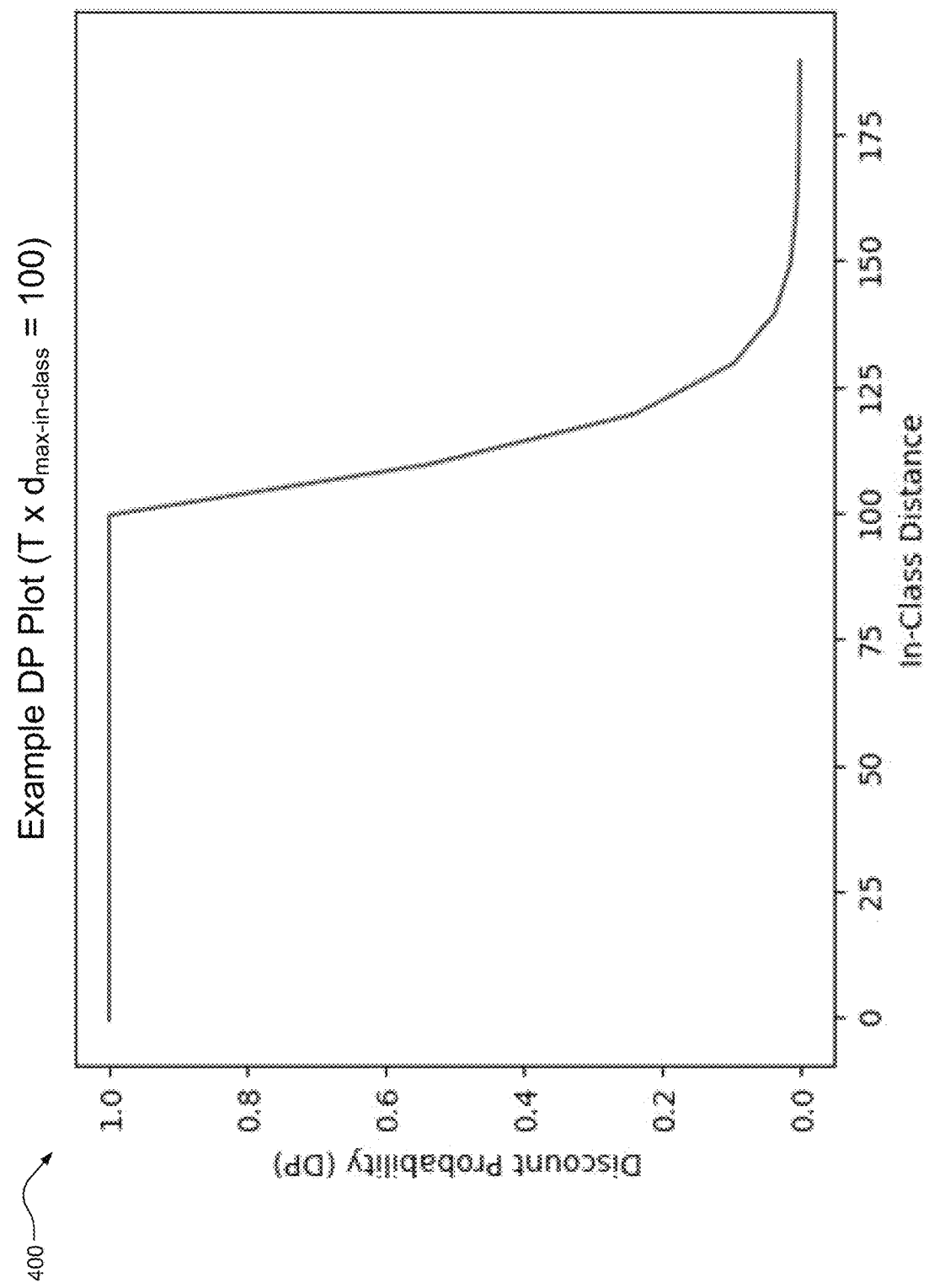
FIG. 4 is a plot illustrating an example discount probability (DP) with an example in-class threshold (T) computed using an example scaled sigmoid function according to the principles of the present application.

For in-class samples, $d \leq d_{max-in-class}$, x=0, and DP=S=1.0. For out-of-class samples, x<0 and DP=S<1.0, and as d increases, DP or S will decrease and approach 0.0 as shown in FIG. 4. Lastly, confidence scores corresponding to out-of-class histograms are adjusted based on the DP values to obtain the adjusted confidence scores (324d). At 328, the controller 216 using the adjusted confidence scores (e.g., in sensor fusion as part of an ADAS or autonomous driving feature. The method 300 then ends or returns to 304 (for additional training) or 316 (for additional usage/implementation).

It will be appreciated that the term "controller" as used herein refers to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A perception system for a vehicle, comprising:
a set of vehicle perception sensors configured to provide a set of inputs, wherein the set of vehicle perception sensors comprises at least a camera system configured to capture images of an environment external to the vehicle; and
a controller configured to:
obtain a training dataset represented by N training histograms, in an image feature space, corresponding to N training images, respectively;
K-means cluster the N training histograms to determine K clusters with respective K respective cluster centers, wherein K and N are integers greater than or equal to one and K is less than or equal to N;
compare the N training histograms to their respective K cluster centers to determine maximum in-class distances for each of K clusters;
apply a deep neural network (DNN) to input images of the set of inputs to output detected/classified objects with respective confidence scores;

obtain adjusted confidence scores by adjusting the confidence scores output by the DNN based on distance ratios of (i) minimal distances of input histograms representing the input images to the K cluster centers and (ii) the respective maximum in-class distance; and use the adjusted confidence scores for sensor fusion as part of an advanced driver-assistance system (ADAS) or autonomous driving feature.

2. The perception system of claim 1, wherein the K-means clustering is a vector quantization technique in which the N training histograms are N vectors that are partitioned into K clusters such that each of the N vectors belongs to a respective cluster of the K clusters having the nearest mean.

3. The perception system of claim 2, wherein the K-means clustering minimizes within-cluster variances but not Euclidean distances.

4. The perception system of claim 1, wherein adjusting the confidence scores further comprises:

determining discount probability (DP) values based on the distance ratios; and adjusting the confidence scores based on the DP values.

5. The perception system of claim 4, wherein adjusting the confidence scores further comprises:

obtaining a threshold for determining if a sample is in-class or out-of-class; and applying a scaled sigmoid function based on the distance ratios and the threshold to compute the DP values.

6. The perception system of claim 5, wherein the scaled sigmoid function (S(x)) to calculate the DP values is:

$$S(x) = \frac{2}{1+e^{-x}} = \frac{2 \times e^x}{e^x + 1}, \text{ where}$$

$$x = K\left(1 - \max\left(\frac{d}{T \times d_{max-in-class}}, 1\right)\right),$$

and where x is the input histograms representing the input images, T is the threshold, K is a scaling factor, and $d_{max-in-class}$ is the maximum in-class distance.

7. The perception system of claim 1, wherein the sensor fusion includes fusing the detected objects/classifications and confidence scores for images captured by the camera system with detected objects/classifications and confidence scores for information gathered by a remainder of the set of vehicle perception sensors to improve object detection/classification accuracy and/or robustness.

8. The perception system of claim 7, wherein the remainder of the set of vehicle perception sensors includes at least one of another camera system, a LIDAR system, a RADAR system, and a map system.

9. A perception method for a vehicle, comprising:

receiving, by a controller of the vehicle and from a set of vehicle perception sensors of the vehicle, a set of inputs, wherein the set of vehicle perception sensors comprises at least a camera system configured to capture images of an environment external to the vehicle;

obtaining, by the controller, a training dataset represented by N training histograms, in an image feature space, corresponding to N training images;

K-means clustering, by the controller, the N training histograms to determine K clusters with respective K respective cluster centers, wherein K and N are integers greater than or equal to one and K is less than or equal to N;

comparing, by the controller, the N training histograms to their respective K cluster centers to determine maximum in-class distances for each of K clusters;

applying, by the controller, a deep neural network (DNN) to input images of the set of inputs to output detected/classified objects with respective confidence scores;

obtaining, by the controller, adjusted confidence scores by adjusting the confidence scores output by the DNN based on distance ratios of (i) minimal distances of input histograms representing the input images to the K cluster centers and (ii) the respective maximum in-class distance; and using, by the controller, the adjusted confidence scores for sensor fusion as part of an advanced driver-assistance system (ADAS) or autonomous driving feature.

10. The perception method of claim 9, wherein the K-means clustering is a vector quantization technique in which the N training histograms are N vectors that are partitioned into K clusters such that each of the N vectors belongs to a respective cluster of the K clusters having the nearest mean.

11. The perception method of claim 10, wherein the K-means clustering minimizes within-cluster variances but not Euclidean distances.

12. The perception method of claim 9, wherein adjusting the confidence scores further comprises:

determining discount probability (DP) values based on the distance ratios; and adjusting the confidence scores based on the DP values.

13. The perception method of claim 12, wherein adjusting the confidence scores further comprises:

obtaining a threshold for determining if a sample is in-class or out-of-class; and applying a scaled sigmoid function based on the distance ratios and the threshold to compute the DP values.

14. The perception method of claim 13, wherein the scaled sigmoid function (S(x)) to calculate the DP values is:

$$S(x) = \frac{2}{1+e^{-x}} = \frac{2 \times e^x}{e^x + 1}, \text{ where}$$

$$x = K\left(1 - \max\left(\frac{d}{T \times d_{max-in-class}}, 1\right)\right),$$

and where x is the input histograms representing the input images, T is the threshold, K is a scaling factor, and $d_{max-in-class}$ is the maximum in-class distance.

15. The perception method of claim 9, wherein the sensor fusion includes fusing the detected objects/classifications and confidence scores for images captured by the camera system with detected objects/classifications and confidence scores for information gathered by a remainder of the set of vehicle perception sensors to improve object detection/classification accuracy and/or robustness.

16. The perception method of claim 15, wherein the remainder of the set of vehicle perception sensors includes at least one of another camera system, a LIDAR system, a RADAR system, and a map system.

* * * * *